F. HERRMANN.
MACHINE FOR MOLDING FLOWER POTS AND OTHER POTTERY.
No. 9,852. Reissued Aug. 30, 1881.
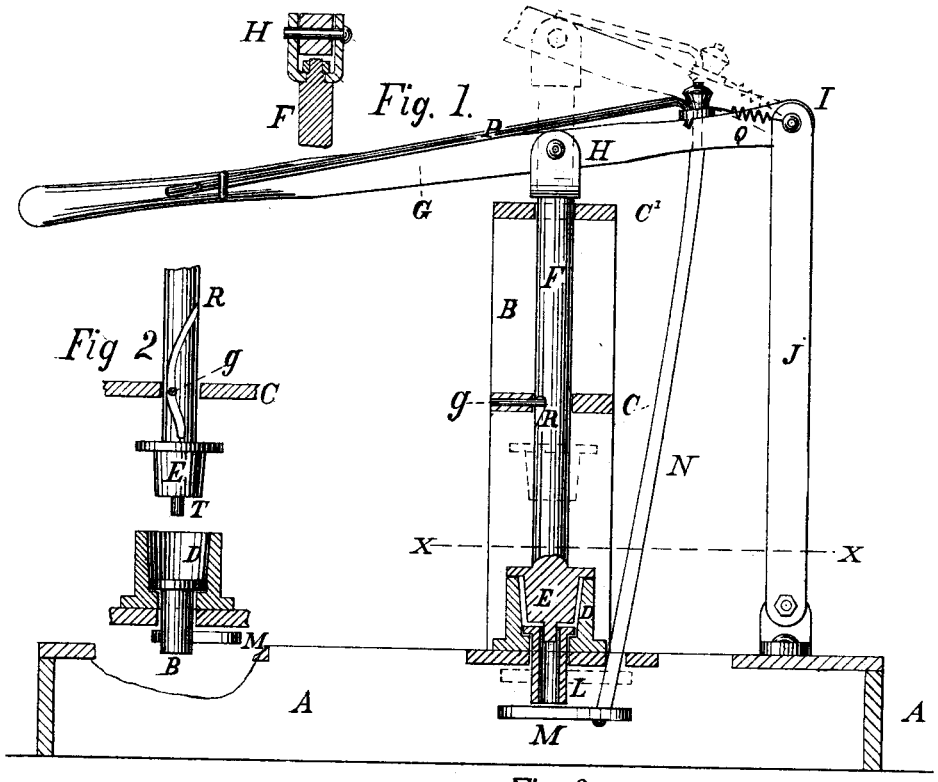
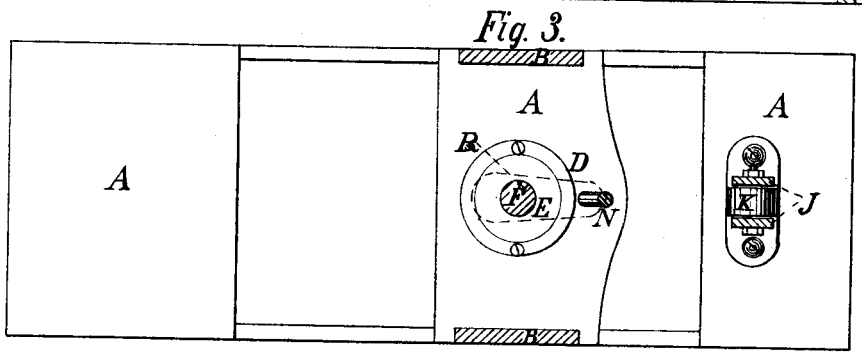
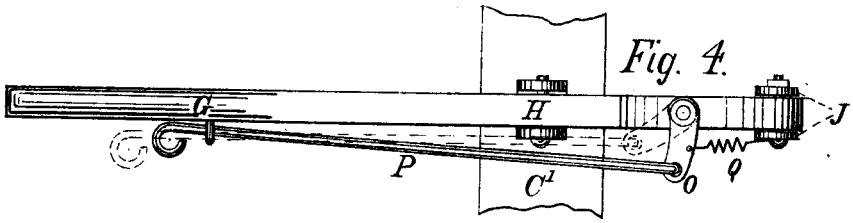
Witnesses.
Chas. A. Bratton
F. W. Robinson
Inventor.
Friedrich Herrmann
by Stout & Underwood
Attorneys.
N. PETERS, Photo-Lithographer, Washington, D. C.

UNITED STATES PATENT OFFICE.

FREDRICH HERRMANN, OF MILWAUKEE, WISCONSIN.

MACHINE FOR MOLDING FLOWER-POTS AND OTHER POTTERY.

SPECIFICATION forming part of Reissued Letters Patent No. 9,852, dated August 30, 1881.

Original No. 128,039, dated June 18, 1872. Application for reissue filed July 23, 1881.

*To all whom it may concern:*

Be it known that I, FREDRICH HERRMANN, of the city and county of Milwaukee, State of Wisconsin, have invented certain new and useful Improvements in Machines for Molding Flower-Pots and other Pottery-Ware, of which the following is a full, clear, and exact description, reference being had to the accompanying drawings, making part of the specification.

My invention relates to that class of pottery-machines in which the female portion of the mold and the bed on which it rests are stationary and the male portion is vertically reciprocated by a plunger-rod and lever; and its nature will be more fully described hereinafter.

In the drawings, Figure 1 is a longitudinal central section of my device, with a detail showing the manner of connecting the plunger-rod with its operating-lever. Fig. 2 is a sectional detail, showing the mold and part of the plunger-rod. Fig. 3 is a horizontal section, and Fig. 4 is a top view of the operating-lever and connecting parts.

A is the bed of my machine, and to this bed are secured uprights B B, connected by cross-bars C C′.

D is the female portion of the mold, secured to the bed midway between the uprights B B in such a manner as to be easily removed and replaced by a larger or smaller one.

F is a plunger-rod, to which is attached the plunger E, that forms the male portion of the mold. This plunger-rod F has bearings in the cross-pieces, and at its top is swiveled to a stirrup, H, in which the operating-lever G is pivoted. The lever G is pivoted at one end to a swinging upright, J, that forms its fulcrum, and carries a rod, N, that depends from it through the bed A, and supports a plate, M. The rod N has a crank-arm on its upper end, by which it may be partially rotated, the rod P serving to draw the crank-arm in one direction and the spring Q to return it to position. Normally the crank-arm is at right angles to the operating-lever G, and when it is in this position the rod N holds the plate M just under the removable bottom portion, L, of the mold, so that when the plate M is lifted it will carry the bottom piece ahead of it to eject the finished article from the female portion of the mold. After this has been accomplished, by drawing on the rod P the operator can turn rod N through its crank-arm, so as to carry the plate M from beneath the bottom piece, L, when it (the bottom plate) falls to its place and leaves the mold ready for more material and another impression.

It has been found that in drawing the male portion of the mold from the female portion in machines made previous to mine it was apt to carry the molded article with it and clinging closely about it, so that its removal by hand was necessary, and this resulted in the breaking and bending out of shape of a great many of the articles; and to obviate this I have connected the plunger-rod to a lever by a swivel, which permits it to be turned, and with it the male portion of the mold. In practice I give the rod a turn in one direction as the male portion E enters the female portion, and another in an opposite direction as it leaves it, and this completely breaks the cohesion between the metal and the clay, so that the plunger, on being withdrawn, will leave the molded article to be forced out by the loose bottom piece, L. The bottom piece, L, is made to fit loosely in the mold, and is entirely disconnected from the rest of the machine, and can be raised and lowered or taken out by hand, so as to be cleaned or replaced by a new one.

To facilitate the turning of the plunger-rod I have provided it with a groove, R, and have provided the cross-piece C with a pin, that, projecting into groove R, partially revolves the rod at each reciprocation.

Having thus described my invention, what I claim as new, and desire to secure by Letters Patent, is—

1. In a machine for molding pottery-ware, a plunger-rod swiveled to its operating-lever and adapted to be partially revolved as it forces the male portion of the mold into the female portion, as and for the purpose set forth.

2. In a machine for molding pottery-ware, a vertically-reciprocating plunger-rod, carrying the male portion of the mold, in combination with the stationary portion of the mold, the said plunger-rod adapted to revolve the male portion both as it enters and leaves the female portion.

3. The plunger-rod having groove R, in combination with the pin *g* and the lever G, as set forth.

4. The combination of plate M, rod N, crank O, wire P, and spring Q, as and for the purpose described.

5. The combination of mold D E, rod F, constructed to move up and down and to partly rotate a lever for operating the same, the removable bottom L, and plate M, as and for the purpose set forth.

As evidence that I claim the above, witness my hand this 19th day of July, 1881.

FREDRICH HERRMANN.

Witnesses:

ALBERT HERRMANN,

S. S. STOUT.